United States Patent [19]
Riesbeck et al.

[11] 3,720,316
[45] March 13, 1973

[54] FLOW CONTROLLER FOR A MATERIAL SEPARATOR

[75] Inventors: Laverne J. Riesbeck; Willis A. Blackwell, both of Canton, Ohio

[73] Assignee: Midwestern Industries, Inc., Massillon, Ohio

[22] Filed: Nov. 25, 1970

[21] Appl. No.: 92,610

[52] U.S. Cl. ................209/254, 209/498, 210/456
[51] Int. Cl. .................................................B07b 1/00
[58] Field of Search......209/254, 246, 243, 498, 499, 209/258, 256, 255; 210/456; 239/506, 513, 514; 222/310

[56] References Cited

UNITED STATES PATENTS

| 3,530,986 | 9/1970 | More et al. | 209/254 X |
| 425,246 | 4/1890 | Paget | 239/514 X |

Primary Examiner—Frank W. Lutter
Assistant Examiner—William Cuchlinski, Jr.
Attorney—Hamilton, Renner & Kenner

[57] ABSTRACT

A device for controlling the flow of a fluid material as it is presented to a screen of a conventional material separator to isolate any solids carried therein consists generally of an adjustable baffle plate within a conical hood member. The input fluid is directed against the baffle plate and is thereby deflected against the hook member which is suspended over the screen. The fluid then follows along the hood member and falls to the screen, being presented thereto as an annular sheet of fluid material. The precise configuration of the sheet of fluid material is controlled by adjusting the axial location of the baffle plate, moving it toward and away from the direction of the flow of the input material. The solids which are unable to pass through the screen are transmitted to a discharge chute located at the periphery of the screen.

5 Claims, 3 Drawing Figures

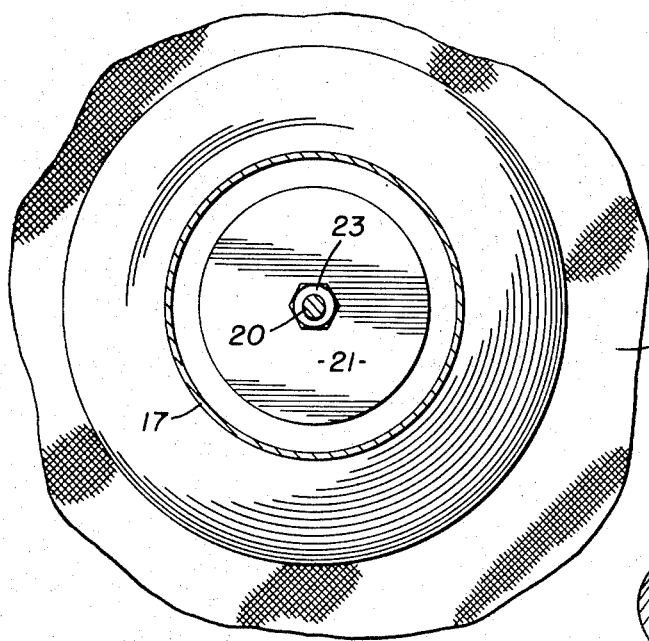
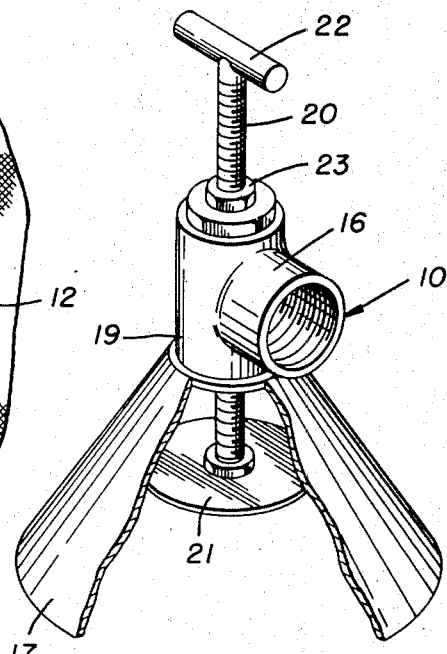
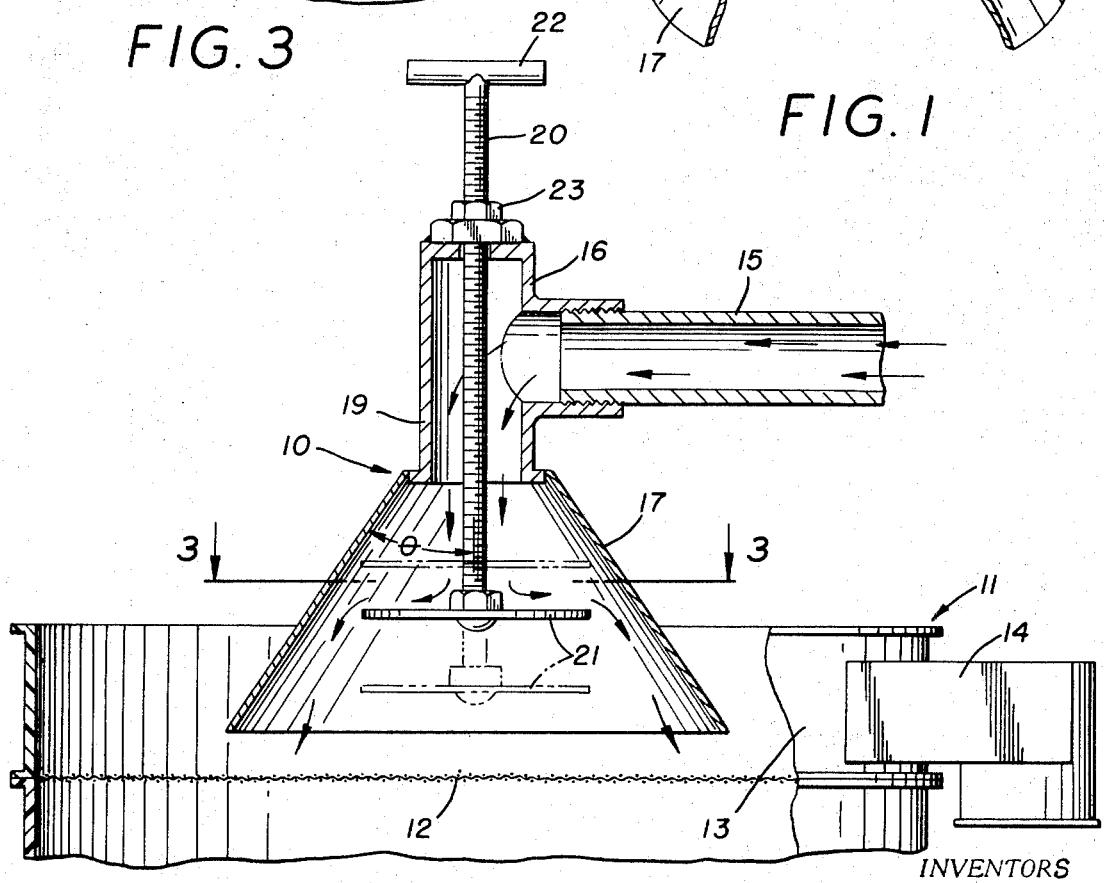
FIG. 3
FIG. 1
FIG. 2
INVENTORS
LAVERNE J. RIESBECK
WILLIS A. BLACKWELL
BY Hamilton, Cook,
Renner & Kenner
ATTORNEYS

FLOW CONTROLLER FOR A MATERIAL SEPARATOR

BACKGROUND OF THE INVENTION

This invention relates to a flow controlling device for use with material separators. More specifically, this invention relates to a device for controlling and directing the flow of a liquid material as it is presented to a screen so that any solids carried by the liquid are separated therefrom.

Many industries utilize material separators, such as that shown environmentally in our U.S. Pat. No. 3,463,315, to classify certain solid materials by size or to separate solid material from liquid material. In the latter situation, if mere separation of solid from liquid is all that is required, the material separator may take on the simple form of a single screen onto which a liquid is fed. The solids are then retained atop the screen while the liquid is removed to some type of basin below. Vibratory motion to the machine causes the solids to migrate toward discharge chutes at the periphery of the screen and thus effective solid-liquid separation is obtained.

In such a solid from liquid separation process, the presentation of the material to the screen is highly critical. In one presently known device, the material is simply fed directly to the screen from above utilizing either a gravity feed or some type of pressurized direct feed system. In either case, a great deal of turbulence is created as the liquid contacts the screen, severely hampering the overall efficiency of the device. The gravity feed is, of course, limited by the amount of material which can be presented in any particular time period. On the other hand, the pressurized feed, while increasing the volume of material presented to the screen, magnifies the aforementioned turbulence problem. Further, either type of direct feed system utilizes only a fraction of the screen surface and thus limits the capacity of the separator.

In an attempt to improve overall efficiency, another device was developed having a vertical screen oriented at the periphery of the horizontal screen. The input material is directed tangentially to the vertical screen and that material not passing therethrough falls onto the horizontal screen and is discharged through an opening at the center thereof. Such a tangential feed, however, with its attendant complex screen design, is not only expensive to install and maintain, but also does not solve all the aforementioned problems. For example, the tangential feed tends to clog or blind the screens to such an extent that most of these devices are provided with an expensive rotating jet stream cleaning device. Further, the oversize material must travel over the entire area of the horizontal screen to reach the discharge chute, this being quite impractical and not desirable in the simple solid from liquid separation process.

Further, none of the aforementioned devices have provided any means for adjusting the pattern of flow of the material as presented to the screen. Such adjustment is highly important, dependent on certain variable parameters such as the flow rate, screen size, solid particle size and desired capacity.

SUMMARY OF THE INVENTION

It is therefore a primary object of the present invention to provide a device which controls the flow of a liquid material having solids entrained therein to the screen of a material separator.

It is another object of the present invention to provide a device, as above, which increases the capacity and otherwise improves the efficiency of the solid from liquid separation process.

It is still another object of the present invention to provide a device, as above, in which the pattern of flow can be adjusted dependent on system parameters.

It is yet another object of the present invention to provide a device, as above, which places the solids at a position on the screen near the discharge chute so that the solids may be removed as quickly as possible.

It is a further object of the present invention to provide a device, as above, which has the greater volume characteristics of the pressurized feed system without the undesirable turbulence problems created thereby.

In general, a flow controlling device constructed according to the concept of the present invention includes a hood member in the form of a truncated cone open at both axial ends. The hood member is suspended in such a manner that the bottom of the larger diameter end is near the horizontal screen of a conventional material separator. The upper or smaller diameter open end of the hood member communicates with an input supply source of fluid material. The solid-liquid material to be separated is fed through the upper end of the conical hood against a transverse circular baffle plate which deflects the fluid against the inside conical surface of the hood. The material is then presented to the screen as an annular sheet and not only contacts more surface area of the screen, but also contacts the screen angularly near the discharge chute improving the overall system efficiency.

Means for adjusting the axial height of the baffle plate are provided to control the precise configuration of the annular sheet of the liquid material and to account for clearance between the baffle and the hood dependent on the size of the solid particles.

BRIEF DESCRIPTION OF THE DRAWINGS

FIG. 1 is a partially broken away perspective view of the flow control device according to a preferred embodiment of the present invention.

FIG. 2 is a sectional view depicting the flow control device according to a preferred embodiment of the present invention as used with a material separator.

FIG. 3 is a sectional view taken substantially along line 3—3 of FIG. 2.

DESCRIPTION OF A PREFERRED EMBODIMENT

The flow controlling device according to the concept of the present invention is indicated generally by the numeral 10 in FIG. 1 and shown in FIG. 2 as being used with a conventional material separator indicated generally by the numeral 11. That portion of the material separator 11 depicted herein includes a horizontal circular screen cloth 12 tensioned across a cylindrical body member 13. A discharge chute 14 is provided at the periphery of screen 12. As is well known in the art, in operation, material is placed on screen 12 which is provided with vibrations from a motor (not shown). The material which is too large to pass through the screen travels outwardly in a spiral fashion until discharged through chute 14. The material passing through screen 12 can be drawn off or can be directed to another horizontial screen member. Further details of the material separator 11 can be found in our U.S. Pat. No. 3,463,315 to which reference is made for such details as may be necessary to fully understand this invention.

While material separators can be utilized for the classification of solids by size, the device depicted herein is generally to be utilized for separating solids from liquids. The solid-liquid material to be separated can be fed to the machine via an input feed pipe 15. A conventional T connection 16 directs the material toward the screen 12. Welded or otherwise affixed to the T connection 16 is a hood member 17 which tapers outwardly downwardly and in the preferred embodiment is shaped somewhat like a truncated cone having both axial ends thereof open. The size of the smaller upper diameter of the hood 17, of course, corresponds to the size of the branch portion 19 of the T connection 16. The size of the larger lower diameter of hood 17 varies dependent on the diameter of the screen 12 and cylindrical body member 13. This dimension, of course, cannot exceed the screen size and is, in the preferred embodiment, somewhat smaller than the screen diameter. The hood 17 is designed in axial height so that a certain clearance exists between the bottom thereof and the screen 12. As will hereinafter be more evident, this clearance must at least be greater than the predicted size of the largest solid particle.

Extending axially through the branch portion 19 of T connection 16 is a threaded rod 20 which carries at its lower end a circular flow control or baffle plate 21. For facile rotation, the top of rod 20 is provided with an adjustment handle 22. Rotation of rod 20 raises or lowers the baffle plate 21 accordingly. When the desired set position is reached, a lock nut 23 can be tightened to prevent accidental rotation of rod 20. It is evident that the diameter of the baffle plate 21 is less than the largest diameter of hood member 17 and greater than the smallest diameter of the hood member.

In operation, fluid is provided through the input feed pipe 15 and directed toward the screen 12. Rather than directly contacting a small area of the screen and creating much turbulence, as in the prior art, all or substantially all of the input fluid is directed against the plate 21, which is oriented transversely of the fluid flow. As shown by the arrows in FIG. 2, the fluid then spreads out around plate 21 and contacts hood 17. From there it is presented to the screen as an annular sheet of fluid thus contacting a much greater area of the screen at a point near the discharge chute 14.

The axial height of the plate 21, being adjustable, as shown in phantom FIG. 2, provides an excellent "tuning" feature for this device. While the distance between the plate 21 and the hood 17 must always be large enough to allow for the passage therebetween of the largest solid particles present in the fluid, a larger opening may at times be desirable. In any event, it has been found that dependent on the material being treated and the screen mesh utilized, a certain axial location of the plate 21 exists where efficiency is the greatest. Sometimes, for example, it is beneficial to provide a finer spray at a higher velocity in which case the plate is located at a higher position, that is, closer to the hood.

The angular taper or inclination of the sides of the conical hood (angle $\theta$, FIG. 2), while not critical, can affect the efficiency somewhat. This is due to the fact that the fluid droplets or spray received from the plate 21 will tend to move down the hood and strike the screen at that angle. Too steep an angle, of course, would compound any turbulence problems previously described. On the other hand, a large angle $\theta$ could also hinder efficiency. It has been found that a hood having an angle $\theta$ of between 20° and 40° is acceptable, with about 30° being preferred.

A flow control device constructed according to the concept of the present invention and utilized with a conventional material separator vastly improves the throughput efficiency in the separation of solids from liquid.

We claim:

1. Apparatus for controlling the flow of fluid material to the screen of a material separator or the like comprising a conical hood means for deflecting the fluid material directly toward the screen angularly away from the center thereof, said hood means being suspended above the screen and having both axial ends thereof open, transverse plate means suspended within and spaced from said hood means, said plate means having a diameter larger than the smaller end of said hood means and having a diameter smaller than the larger end of said hood means, means to adjust the axial position of said plate means, and means affixed to the smaller lend of said hood means and supporting said hood means to present the fluid material through the smaller end of said hood means and against said plate means so that the fluid material is deflected therefrom toward said hood means, the larger end of said hood means being proximate the screen and spaced inwardly of the outer periphery of the screen.

2. Apparatus according to claim 1 wherein said plate means is circular.

3. Apparatus according to claim 1 wherein said means to present the liquid material includes piping means.

4. Apparatus according to claim 1 wherein said means to adjust the axial position of said plate means includes a threaded rod attached at one end to said plate means so that rotation thereof selectively raises and lowers said plate means.

5. Apparatus according to claim 4 wherein said plate means is suspended within and spaced from said hood means by said rod, said rod being adjustably affixed to said means to present the liquid material against said plate means.

* * * * *